(12) United States Patent
Gao et al.

(10) Patent No.: US 11,196,943 B2
(45) Date of Patent: Dec. 7, 2021

(54) VIDEO ANALYSIS AND MANAGEMENT TECHNIQUES FOR MEDIA CAPTURE AND RETENTION

(71) Applicant: Apple Inc., Cupertino, CA (US)

(72) Inventors: Shuang Gao, Cupertino, CA (US); Vasilios E. Anton, Cupertino, CA (US); Robert A. Bailey, Cupertino, CA (US); Emilie Kim, Cupertino, CA (US); Vignesh Jagadeesh, Cupertino, CA (US); Paul Schneider, Cupertino, CA (US); Piotr Stanczyk, Cupertino, CA (US); Arwen Bradley, Cupertino, CA (US); Jason Klivington, Cupertino, CA (US); Jacques Gasselin De Richebourg, Cupertino, CA (US); Joe Triscari, Cupertino, CA (US); Sébastien Beysserie, Milpitas, CA (US); Yang Yang, Cupertino, CA (US); Afshin Dehghan, Cupertino, CA (US); Rudolph van der Merwe, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/653,704

(22) Filed: Oct. 15, 2019

(65) Prior Publication Data
US 2020/0382725 A1 Dec. 3, 2020

Related U.S. Application Data

(60) Provisional application No. 62/855,874, filed on May 31, 2019.

(51) Int. Cl.
*H04N 5/262* (2006.01)
*H04N 5/232* (2006.01)
(Continued)

(52) U.S. Cl.
CPC ......... *H04N 5/2628* (2013.01); *H04N 1/2112* (2013.01); *H04N 5/2258* (2013.01);
(Continued)

(58) Field of Classification Search
CPC ............ H04N 5/2628; H04N 5/23296; H04N 1/2112; H04N 5/23218; H04N 5/23293;
(Continued)

(56) References Cited

U.S. PATENT DOCUMENTS

| 6,853,809 B2 * | 2/2005 | Pelletier | G08B 13/19628 348/159 |
| 8,488,001 B2 * | 7/2013 | Mohanty | H04N 7/181 348/159 |

(Continued)

FOREIGN PATENT DOCUMENTS

| CN | 102959941 A | 3/2013 |
| CN | 107800930 A | 3/2018 |

(Continued)

*Primary Examiner* — Timothy J Henn
(74) *Attorney, Agent, or Firm* — BakerHostetler

(57) ABSTRACT

Techniques are disclosed for editing captured media to overcome operational difficulties that may arise during capture operations. According to these techniques, content may be captured with a pair of cameras, a first camera having a wider field of view than a second camera. Object(s) may be detected from captured content from the wider field of view camera. The captured content may be processed from the wider field of view camera in a location of at least one detected object. Typically, operators may attempt to frame content using content from the narrower field of view camera. As a result, operators may be unaware that desired content is captured using a second, wider field of view camera. Results from the processed wider field of view data may be proposed to operators for review and, if desired, retention.

42 Claims, 6 Drawing Sheets

(51) Int. Cl.
*H04N 5/225* (2006.01)
*H04N 1/21* (2006.01)

(52) U.S. Cl.
CPC ..... *H04N 5/23218* (2018.08); *H04N 5/23229* (2013.01); *H04N 5/23293* (2013.01); *H04N 5/23296* (2013.01); *H04N 5/23258* (2013.01); *H04N 5/23267* (2013.01)

(58) Field of Classification Search
CPC ............. H04N 5/2258; H04N 5/23229; H04N 5/23267; H04N 5/23258
See application file for complete search history.

(56) References Cited

U.S. PATENT DOCUMENTS

| | | | | |
|---|---|---|---|---|
| 11,032,467 B2* | 6/2021 | Kim | .................... | H04N 5/23218 |
| 2006/0056056 A1* | 3/2006 | Ahiska | ............. | G08B 13/19643 |
| | | | | 359/690 |
| 2006/0126738 A1* | 6/2006 | Boice | ..................... | H04N 7/181 |
| | | | | 375/240.16 |
| 2007/0092245 A1* | 4/2007 | Bazakos | ............ | G06K 9/00255 |
| | | | | 396/427 |
| 2009/0303351 A1 | 12/2009 | Ogawa | | |
| 2010/0265331 A1* | 10/2010 | Tanaka | ............... | H04N 5/23299 |
| | | | | 348/159 |
| 2013/0100255 A1* | 4/2013 | Ohba | ................... | G06K 9/3216 |
| | | | | 348/47 |
| 2019/0082101 A1* | 3/2019 | Baldwin | ............ | H04N 5/23216 |
| 2021/0195109 A1* | 6/2021 | An | ................... | H04N 5/232935 |

FOREIGN PATENT DOCUMENTS

| | | |
|---|---|---|
| CN | 107835372 A | 3/2018 |
| CN | 109155842 A | 1/2019 |
| JP | 2012-235198 A | 11/2012 |

* cited by examiner

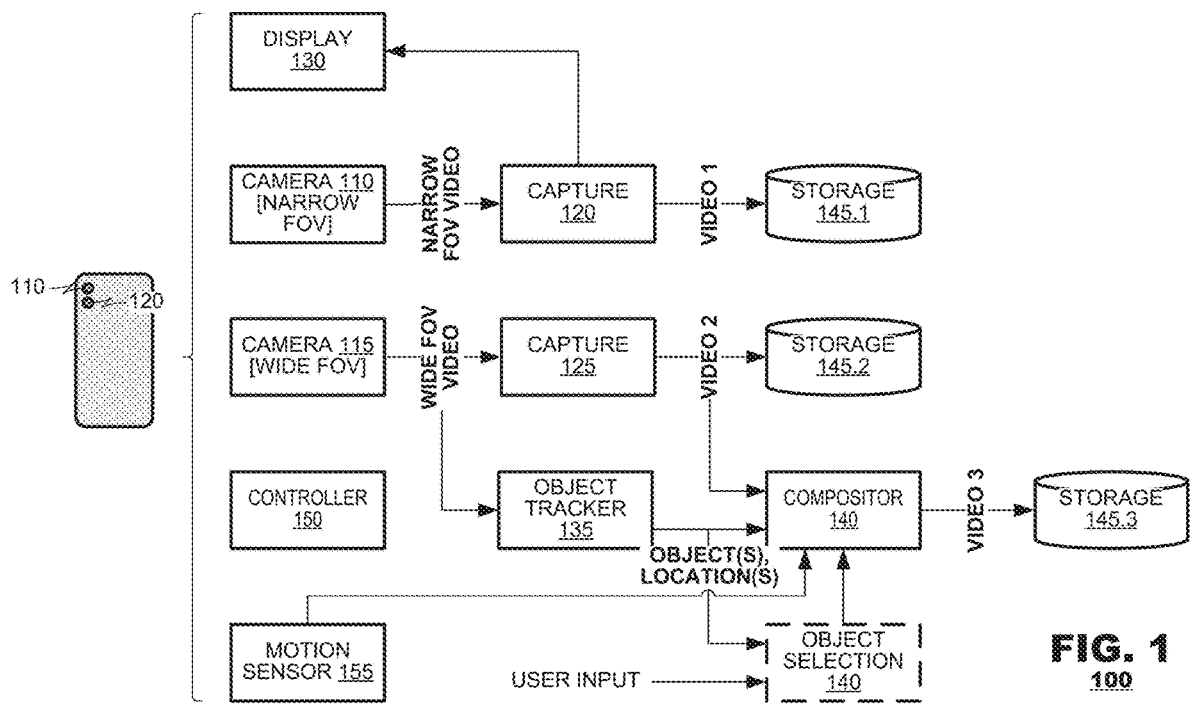
FIG. 1
100
FIG. 2
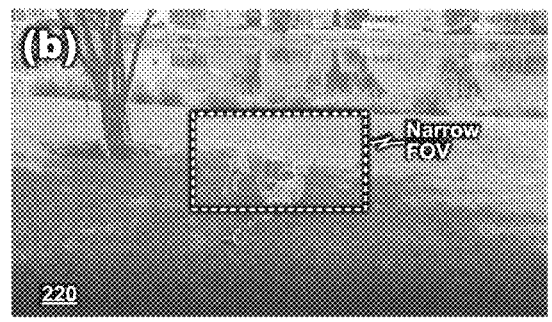

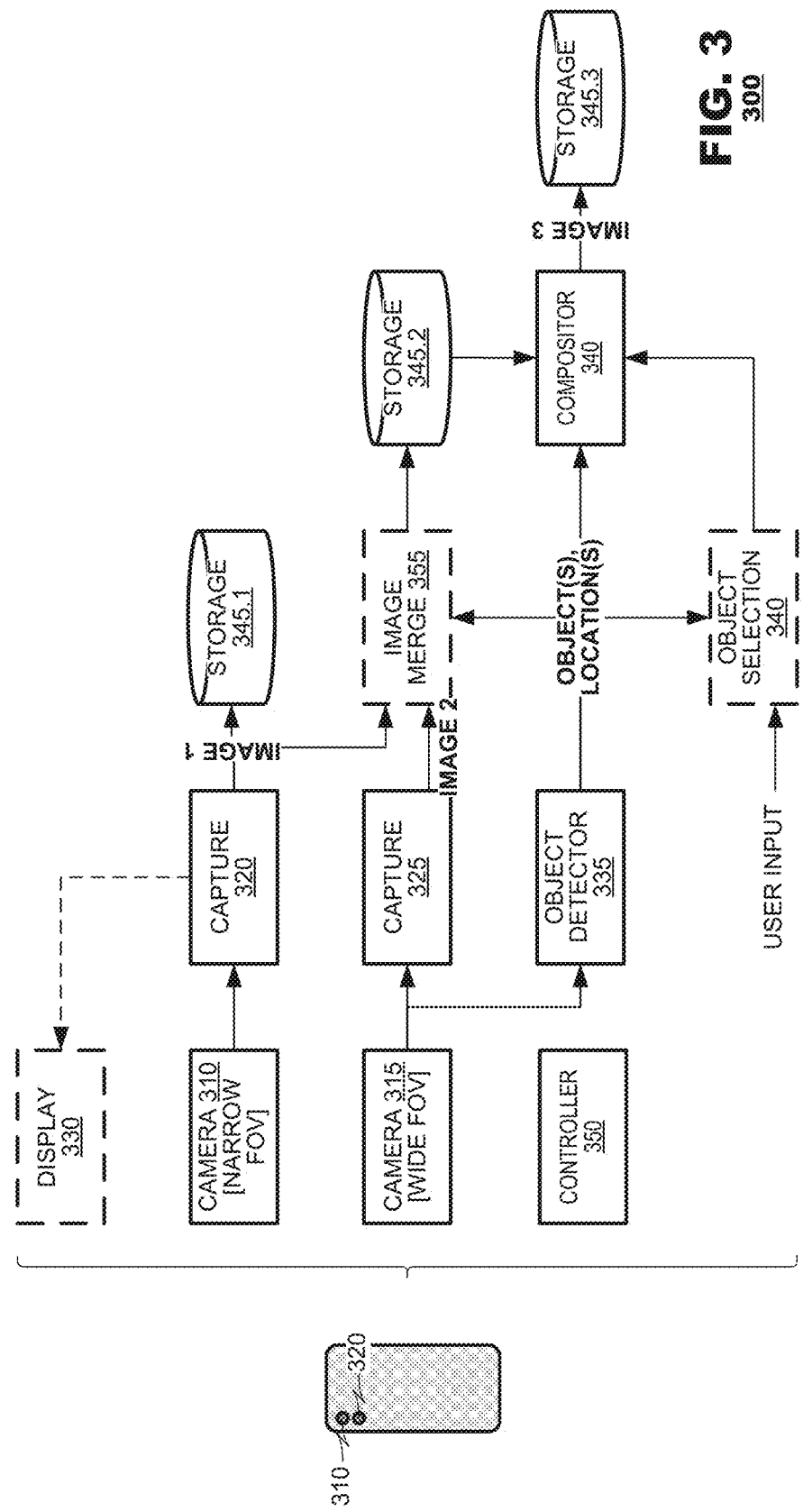

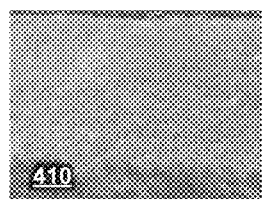
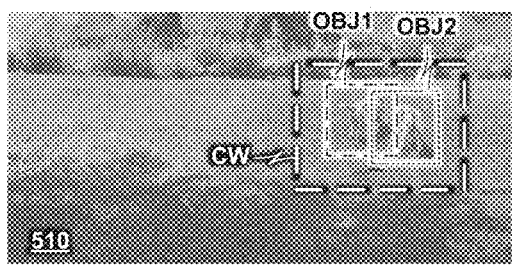
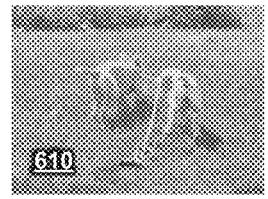
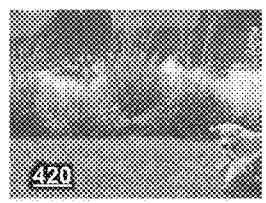
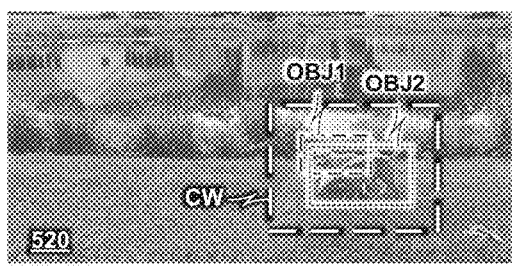
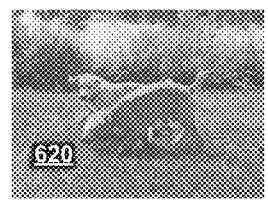
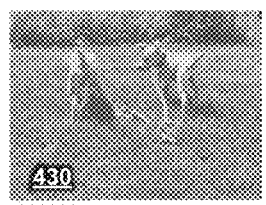
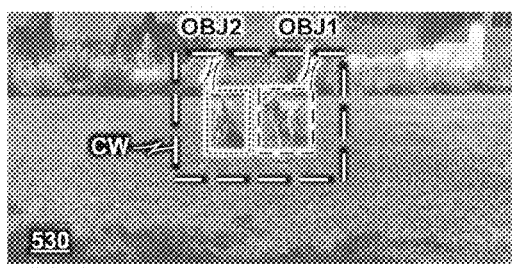
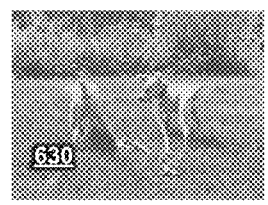
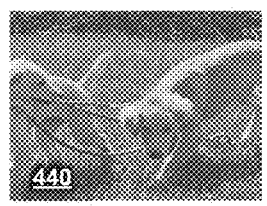
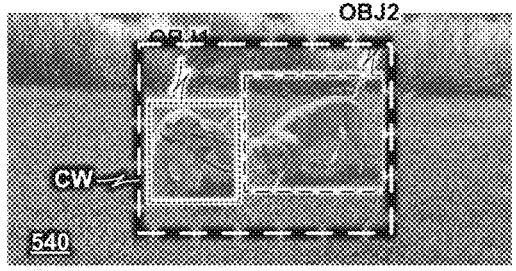
FIG. 4       FIG. 5       FIG. 6

700

800

VIDEO ANALYSIS AND MANAGEMENT TECHNIQUES FOR MEDIA CAPTURE AND RETENTION

CROSS REFERENCE TO RELATED APPLICATIONS

This application claims priority to U.S. Provisional Patent Application No. 62/855,874, filed May 31, 2019, herein incorporated by reference in its entirety.

BACKGROUND

The present disclosure relates to media capture using consumer electronic devices.

Consumer devices routinely possess one or more camera systems that permit operators to capture images and video of their daily lives. While such devices provide convenient tools for such users, operators can have difficulty during capture events. Such camera systems commonly are integrated in multi-use devices, which also serve, for example, as telephones, web browsers, media players, personal information managers. These devices typically have form factors that serve these competing uses, which can make it difficult for operators to hold the device steady during image and/or video capture events. Indeed, the form factors of these devices have been reduced to such a degree that seemingly small operator motion artifacts can induce large motion in captured images and/or video.

Many of these devices have several image capture systems. For example, a single device can have several camera systems facing in a common direction, each with their own optical systems. As a practical matter, it is possible to display content from only one of these cameras to an operator as the operator frames image content during a capture event. It is possible that an operator may perceive a capture event as failing to capture desired content due to the operator's observation of data from one camera when, in fact, another camera on the device has captured the desired content.

BRIEF DESCRIPTION OF THE DRAWINGS

FIG. 1 is a functional block diagram of a system according to an aspect of the present disclosure.

FIG. 2(a) illustrates exemplary frames that may be generated by a narrow FOV camera, and FIG. 2(b) illustrates exemplary frames that may be generated by a wide FOV camera.

FIG. 3 is a functional block diagram of a system according to another aspect of the present disclosure.

FIG. 4 illustrates an exemplary sequence of frames suitable for use with according to an aspect of the present disclosure.

FIG. 5 illustrates exemplary detected objects and composition operations according to an aspect of the present disclosure.

FIG. 6 illustrates exemplary frames that may be generated from a compositor according to an aspect of the present disclosure.

DETAILED DESCRIPTION

Figure 7:
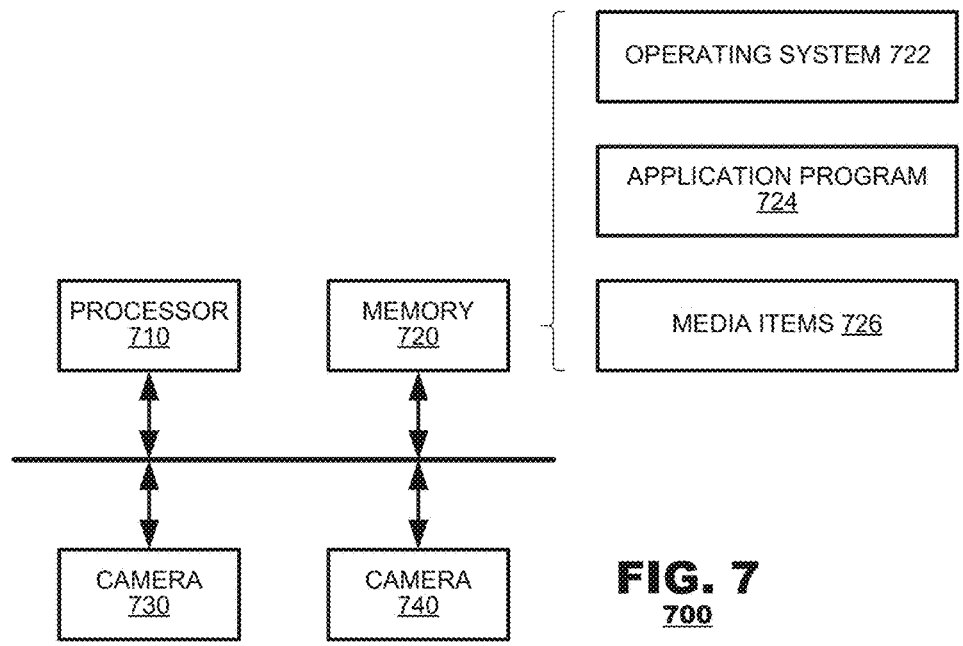
FIG. 7 illustrates a processing system suitable for use with an aspect of the present disclosure.

Aspects of the present disclosure provide techniques for editing captured media to overcome operational difficulties that may arise during capture operations. According to these aspects, content may be captured with a pair of cameras, a first camera having a wider field of view than a second camera. Object(s) may be detected from captured content from the wider field of view camera. The captured content may be processed from the wider field of view camera in a location of at least one detected object. Results from the processed wider field of view data may be proposed to operators for review and, if desired, retention.

FIG. 1 is a functional block diagram of a system 100 according to an aspect of the present disclosure. The system 100 may include a pair of cameras 110, 115, a pair of video capture systems 120, 125, a display 130, an object tracker 135, a compositor 140, and a storage system 145 (shown as 145.1, 145.2, 145.3). These components may operate under control of a controller 150.

The cameras 110, 115 may have different fields of view (commonly, "FOV") with respect to each other, one wider than the other. For convenience, a first camera 110 is described herein as having a "narrow" field of view and a second camera 115 is described as having a "wide" field of view. Thus, when video data is captured by the two cameras, content of a video output by the wide FOV camera 115 likely will contain content of video output by the narrow FOV camera 110 and additional content not found in the video output by the narrow FOV camera 110. FIG. 2 illustrates exemplary frames 210, 220 that may be obtained from a narrow FOV camera (FIG. 2(a)) and a wide FOV camera (FIG. 2(b)), respectively. As illustrated in FIG. 2 (b), video content of the narrow FOV camera may be subsumed within video content of the wide FOV camera. In practice, video content of the narrow FOV camera and corresponding video content of the wide FOV camera will not be identical to each other; operational differences between the camera systems (e.g., sensor resolution, optical response of sensor systems, lens properties, auto-focus and auto-exposure capabilities, and camera mounting locations) may cause content differences to exist between the content in these regions. Nevertheless, content of these regions may have good correlation to each other for analytical purposes.

The video capture systems 120, 125 of each camera 110, 115 may control video capture operations performed by the cameras. For example, in response to capture control commands from a controller 150, the video capture systems may cause video captured by the respective camera systems 110, 115 to be stored. A controller 150 may issue capture commands in response to operator commands entered into a user interface (not shown) of the device. In this manner, the system 100 may create video files representing video designated for capture by an operator. User commands may designate properties of video capture, for example, full-rate video capture or "slow motion" video capture and other properties that govern how video from the cameras 110, 115 are to be recorded. The video capture systems 120, 125 may apply such capture modes when storing videos generated by their capture systems. Videos generated by the capture systems 120, 125, shown as "video 1" and "video 2," respectively, may be stored in storage on the system 100.

During operation, the system 100 may display camera output from the narrow FOV camera 110 on a display 130, which may assist an operator to frame video appropriately and to control other operations of the system (e.g., to select beginnings and ends of video capture operations).

The object tracker 135 may receive video output from the wide FOV camera 115 and apply object tracking to content of the video. The object tracker 135 may perform a variety of object recognition processes upon the video, for example, human face recognition, human body recognition, animal recognition, and the like. The object tracker 135 may include a machine learning system (such as a neural network (not shown)) that has been trained to recognize predetermined types of objects in video content. When the object tracker recognizes object(s) in image content, the tracker 135 may generate data identifying the object(s), and their spatial location(s) within image content.

The compositor 140 may generate a video from wide FOV video content based on output of the object tracker 135. For example, the compositor 140 may generate cropping windows for video based on object(s) identified by the object tracker 135 and their location(s) within video content and crop the wide FOV video accordingly. In this manner, the system 100 may overcome framing inconsistencies introduced by an operator. A processed video from the compositor 140 may be stored in storage 145.3 (shown as "video 3").

In an aspect, the system 100 may include a motion sensor 155 which generates data representing motion activity of the system 100 that occurs during capture operations. Motion data may be output to the compositor 140, which the compositor 140 may use to perform image stabilization. For example, the compositor 140 may estimate frame-to-frame motion of video content according to feature detection, feature matching and estimated homographies among matched features. A compositor 140 may estimate frame-to-frame motion from motion sensor data. The compositor 140 also may identify features within frames of video content and perform registration operation to align the detected features. The motion sensor 155 may be provided as an accelerometer or a gyroscope.

Figure 8:
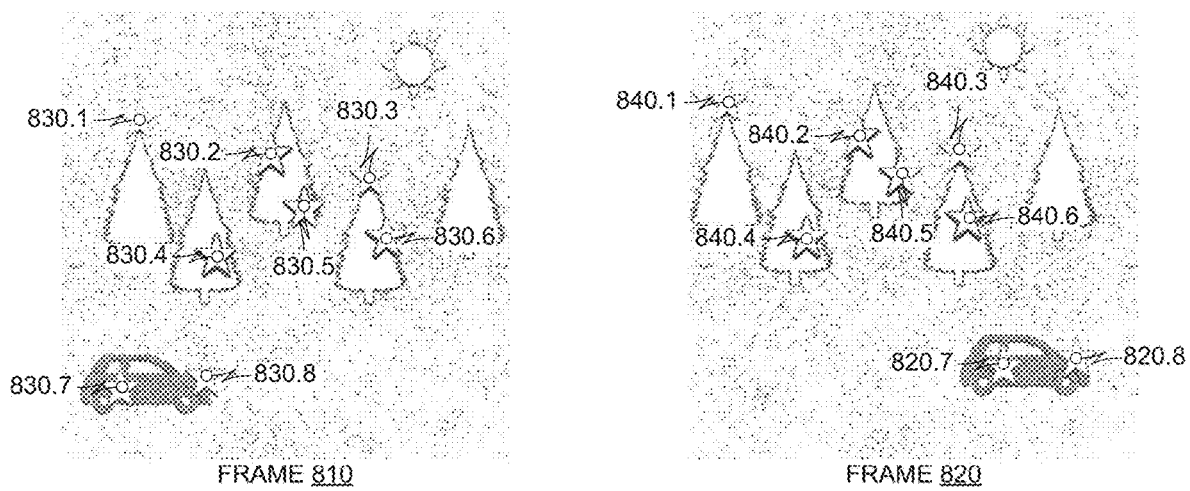
FIG. 8 illustrates operation of feature detection and feature matching according to an aspect of the present disclosure.

FIG. 8 illustrates operation of feature detection and feature matching according to an aspect of the present disclosure. FIG. 8 illustrates adjacent frames 810 and 820 from an exemplary video sequence. Image analysis may detect a plurality of content features, shown as features 830.1-830.8 in frame 810 and features 840.1-840.8 in frame 820. Motion sensor data may provide a coarse basis to align many features 830.1-830.8 in frame 810 to their counterparts 840.1-840.8 in frame 820. In practice, it may occur that feature matching will not occur for all features in a given pair of frames, owing to effects such as competing homographic planes, blur effects, occlusions and distinction loss of features in given frames. Moreover, some features may be derived from objects that move in a field of view (e.g., features 830.7, 830.8), which when other features 830.1-830.6 are matched, become outliers.

Figure 9:
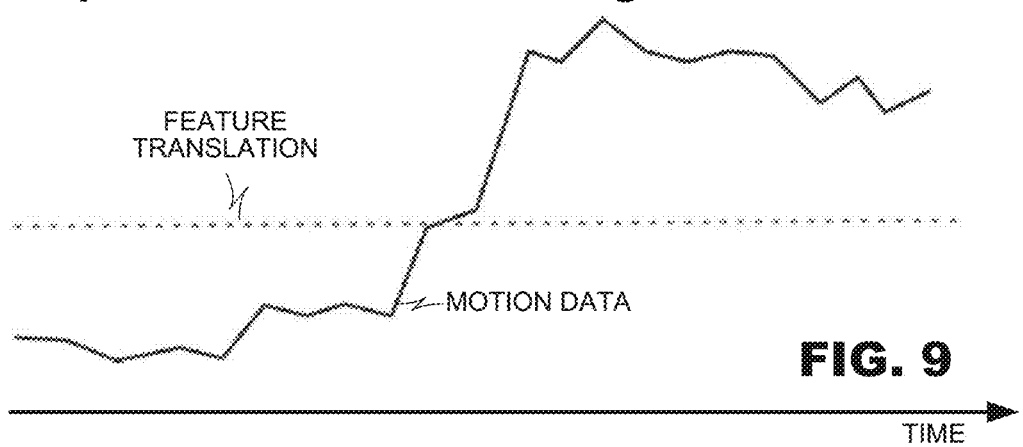
FIG. 9 illustrates a first motion stabilization according to an aspect of the present disclosure.

Stabilization operations may control cropping windows to cause detected features to exhibit controlled translation within a video's field of view. In a first aspect, represented in FIG. 9, cropping windows may be defined to null out motion of matched features within a field of view. As illustrated, matched features have no motion notwithstanding non-zero motion as represented in motion data. Such controls are labeled a "tripod" stabilization mode because they impart an effect on video as if the video were mounted on a tripod during video capture.

Figure 10:
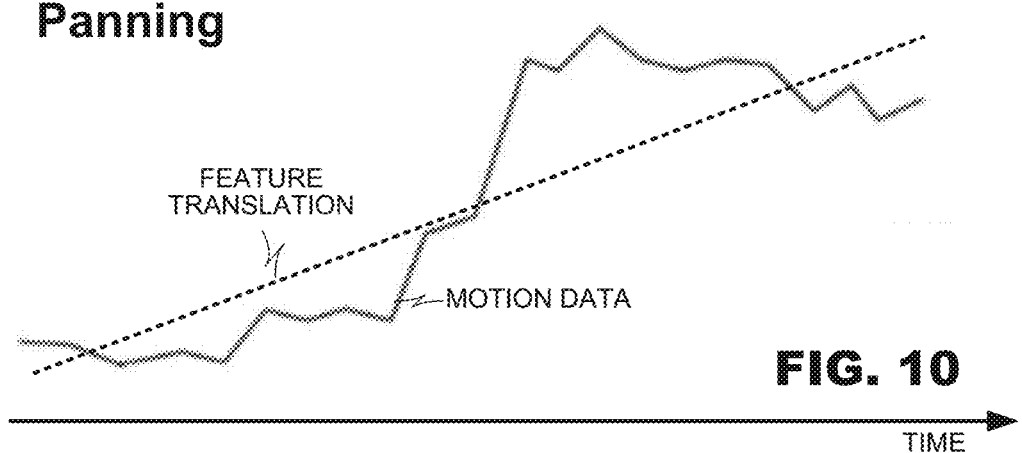
FIG. 10 illustrates a second motion stabilization according to an aspect of the present disclosure.

In another aspect, represented in FIG. 10, cropping windows may be defined to impart uniform motion to matched features within a field of view notwithstanding non-uniform motion as represented in motion data. Such controls are labeled a "panning" stabilization mode because they impart an effect on video as if the video were mounted on a tripod during video capture.

Figure 11:
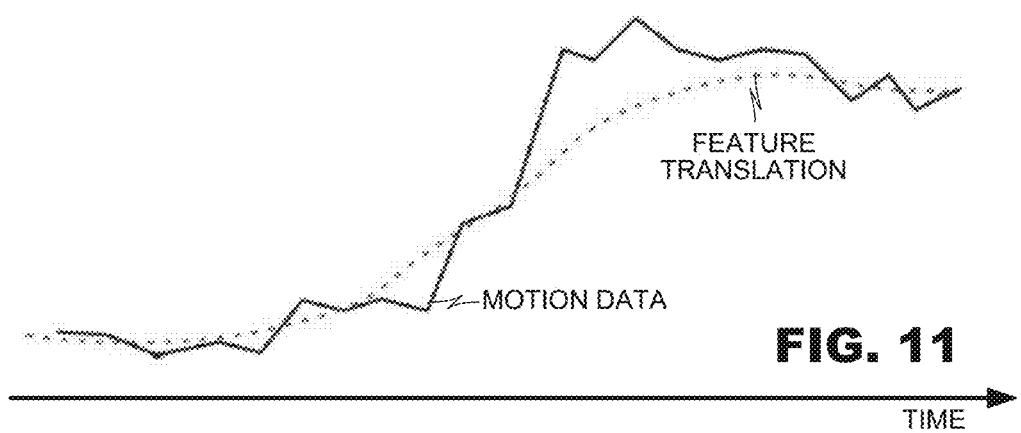
FIG. 11 illustrates a third motion stabilization according to an aspect of the present disclosure.

In a further aspect, represented in FIG. 11, cropping windows may be defined to apply an acceleration-modeled trajectory to matched features within a field of view based on determined motion data. For example, the acceleration trajectory may be selected according to L1-norm minimization techniques that minimize derivatives of camera position such as by position, velocity and acceleration. Video smoothed in this manner is expected to provide a video that is perceived to have greater stability than its source video.

Figure 12:
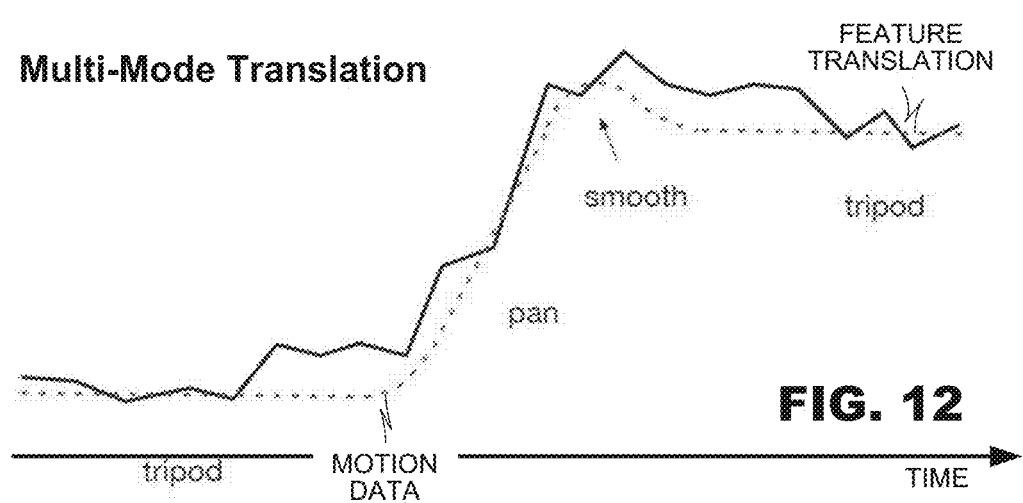
FIG. 12 illustrates a fourth motion stabilization according to an aspect of the present disclosure.

Moreover, as illustrated in the aspect of FIG. 12, stabilization operations may toggle among the different modes—tripod, panning, and acceleration-modeled smoothing—based on motion data. Stabilization operations may be applied on segments of video and a mode selection made to minimize accumulated deviation between detected motion data and estimated feature trajectory(ies).

FIG. 3 is a functional block diagram of a system 300 according to an aspect of the present disclosure. The system 300 may include a pair of cameras 310, 315, a pair of image capture systems 320, 325, a display 330, an object detector 335, a compositor 340, and a storage system 345 (shown as 345.1, 345.2, 345.3). These components may operate under control of a controller 350.

As in the aspect illustrated in FIG. 1, the cameras 310, 315 may have different fields of view with respect to each other, one "narrow" and the other "wide." Thus, when image data is captured by the two cameras, content of an image output by the wide FOV camera 315 (image 1) likely will contain content of image output by the narrow FOV camera 310 and additional content not found in the image output by the narrow FOV camera 310. Again, FIG. 2 illustrates exemplary relationships among fields of view that may exist between the two cameras 310, 315. In practice, image content of the narrow FOV camera 310 and corresponding image content of the wide FOV camera 320 will not be identical to each other; operational differences between the camera systems (e.g., sensor resolution, optical response of sensor systems, lens properties, auto-focus and auto-exposure capabilities, and camera mounting locations) may cause content differences to exist between the content in these regions. Nevertheless, content of these regions may have good correlation to each other for analytical purposes.

The image capture systems 320, 325 of each camera 310, 315 may control image capture operations performed by the cameras. For example, in response to capture control commands from a controller 350, the image capture systems may cause image captured by the respective camera systems 310, 315 to be stored. A controller 350 may issue capture commands in response to operator commands entered into a user interface (not shown) of the system 300. In this manner, the system 300 may create image files representing image designated for capture by an operator. User commands may designate properties of image capture, for example, an image capture mode (e.g., HDR or SDR, a single shot image capture vs. multi-shot image capture, etc.), and other properties that govern how images from the cameras 310, 315 are to be generator. The image capture systems 320, 325 may apply such capture modes when storing images generated by their capture systems. Images generated by the capture systems 320, 325, shown as "image 1" and "image 2," respectively, may be stored in storage on the system 300.

In an aspect, the system 300 may employ an image merger unit 355 that perform image fusion between an image generated by a narrow FOV camera 310 and a wide FOV camera 315. In application, it may occur that a narrow FOV camera 310 generates higher resolution image content in its field of view than corresponding image content from the wide FOV camera 315. An image merger unit 355 may perform image stitching to fuse content from the two images together, yielding a higher resolution image in region(s) that correspond to the field of view of the narrow FOV camera. Typically, such image fusion involves identifying objects within the overlapping fields of view, aligning the content, and blending the content.

During operation, the system 300 may display camera output from the narrow FOV camera 310 on a display 330, which may assist an operator to frame the image appropriately and to control other operations of the system (e.g., to select beginnings and ends of image capture operations).

The object detector 335 may receive image output from the wide FOV camera 315 and apply object detection to content of the image. The object detector 335 may perform a variety of object detection processes upon the image, for example, human face recognition, human body recognition, animal recognition. The object detector 335 may include a machine learning system (such as a neural network (not shown)) that has been trained to recognize predetermined types of objects in image content. When the object detector recognizes object(s) in image content, the detector 335 may generate data identifying the object(s), and their spatial location(s) within image content. In one aspect, the object and location data may be stored with the wide FOV image data for later processing.

In another aspect, a compositor 340 may generate a new image from wide FOV image content based on output of the object detector 335. For example, the compositor 340 may crop the image based on object(s) identified by the object detector 335 and their location(s) within image content. In this manner, the system 300 may overcome framing inconsistencies introduced by an operator. A processed image from the compositor 340 may be stored in storage 345.3 (shown as "image 3"). Where multiple objects are identified in disparate locations of a wide FOV image, the compositor 340 may derive multiple image from a common wide FOV image each developed from a cropping window generated for a respective object.

FIGS. 4-6 illustrate exemplary operation of a compositor 140 (FIG. 1), 340 (FIG. 3) with reference to mock ups of video/image data. Although the following discussion description application of a compositor to video data, the principles of the discussion also apply to image data. FIG. 4 illustrates a sequence of frames 410-440 representing exemplary data that may be generated from a narrow FOV camera 110 (FIG. 1). FIG. 5 illustrates a sequence of frames 510-540 representing exemplary data that may be generate from a wide FOV camera 115. In the example illustrated in FIGS. 4 and 5, there is a fixed relationship between the fields of view of both cameras so that the content of the frames 410-440 from the narrow FOV camera appear in a central area of the frames 510-540.

As discussed in connection with FIG. 1, an object tracker 130 may recognize various objects from content of narrow FOV video. The example of FIG. 5 illustrates a pair of objects OBJ1, OBJ2 recognized within each of the frames 510-540. As illustrated in FIG. 4, content of the objects OBJ1, OBJ2 are not present in frame 410, they are present only partially in frame 420, and they are present in frames 430 and 440 at different sizes.

As discussed, also in connection with FIG. 1, a compositor 140 may derive a new video from wide FOV video based on the type(s) and location(s) of objects recognized in the wide view FOV. In the example of FIG. 5, a compositor 140 may define cropping windows CW that circumscribe the objects OBJ1, OBJ2 that are detected in the frames 510-540. The compositor 140 may crop the wide FOV video sequence according to the cropping window defined for those frames 510-540, generating new frames 610-640 (FIG. 6) therefrom. Thus, as compared to the frames 410-440 generated from a narrow FOV camera 110, the frames 610-640 generated by a compositor 140 retain detected object(s) within video content. Such operations are expected to generate videos with higher perceived quality notwithstanding difficulties in framing fast-moving content because objects will be retained in video content.

A compositor 140 (FIG. 1) may perform a variety of video composition techniques. First, as illustrated in FIG. 5, frames 510-530, a compositor 140 may define a cropping window CW that circumscribes object(s) detected in the wide FOV video. In a simple application, the cropping window CW may possess a fixed size and have a location that varies across frames 510-530 of the wide FOV video sequence in correspondence with a location of the object(s) detected within the video.

In another aspect, a compositor 140 may blend cropping and digital zoom operations, as illustrated in frames 510-540. In the example of FIG. 5, the cropping windows CW are illustrated as having a common size in frames 510-530 and a larger size in frame 540. In this example, the objects OBJ1, OBJ2 are illustrated as being larger in frame 540 than in frames 510-530. Thus, a compositor 140 may respond to changing sizes of objects in video by altering the size of a cropping window CW to match, then rescaling cropped video to a common size. In the example of FIG. 6, the frame 640 is shown rescaled to a size that matches a size of frames 610-630 even though frame 640 was derived from a larger cropping window CW applied to frame 540 than the cropping windows applied to frames 510-530.

The principles of the present disclosure accommodate a variety of use cases to define cropping windows. In a first aspect, a compositor 140 may determine an aggregate area within video content that is occupied by detected objects, and define a cropping window that circumscribes this area. Having defined a cropping window for each frame of a video sequence, the compositor 140 may apply a smoothing operation to the cropping windows to reduce frame-to-frame disparity that may exist among the cropping windows of the various frames.

In another aspect, the system 100 may include an object selector 140 that selects an object to be a primary object for purposes a cropping. It may occur that different objects move to different locations within a video sequence, making it difficult to define a unitary cropping window that includes all such objects. An object selector 140 may designate one of the detected objects as a primary object, which the compositor 140 may use to define cropping windows. In this manner, the compositor 140 may define a cropping window that circumscribes the primary object (and, optionally, other secondary objects that may be near the primary object within image content).

Primary objects may be defined in a variety of ways. First, an object that appears in a region of the wide FOV video content that overlaps the field of view of the narrow FOV camera may be selected as a primary object. Alternatively, an object that has a largest overall size within the wide FOV video content may be selected as a primary object. In yet another aspect, a system 100 may display indicators to a user identifying objects detected in the image content (typically, the narrow FOV video content) and accept a user selection of a primary object.

In an aspect, cropping windows may be defined to enclose a larger area of video content than are occupied by detected objects. Many object trackers are trained to recognize content that, when viewed by human observers, represent a portion of an object of interest. For example, an object tracker trained to recognize human bodies may generate location data that does not include hands or feet, which human observers would consider part of the human body. Similarly, human face detectors and animal detectors may generate location data the omit certain portion(s) of content that human observers would associate with those objects. In an aspect, cropping windows may be defined to be larger than the locations identified by the object tracker 135, which may cause additional portion(s) of the object to be included in video data when generated by the compositor 140.

Similarly, a compositor 140 may estimate frame-to-frame motion of content contained within video content. Cropping windows may be defined to include content elements that are not recognized as belonging to an object but are located in proximity to object(s) and exhibit motion that correlates to object motion. In this regard, cropping windows may be defined that include content elements that detected objects interact with (such as content elements being held by detected objects, content elements pulled or pushed by detected objects, and the like).

And, as discussed above, the compositor 140 may perform video stabilization using motion data provided by a motion sensor 155 (FIG. 1).

In another aspect, a compositor 140 may perform perspective correction on video data, correcting for image distortion that may occur as a result of distance of subject(s) from the cameras. In such operations, an object tracker 130 may estimate distances of object(s) from a camera based on detected sizes of the objects. A compositor 140 may introduce content corrections by resizing image content that based on the contents estimated distances. Further, a compositor 140 may estimate distances of non-object content (e.g., background elements, architectural elements of video content) and derive corrections of video frames from these estimations.

In another aspect, a compositor 140 may perform horizon correction on video data, correcting video content for tilting that may appear in the content due to device skew during video capture.

The foregoing aspects are expected to find application in a media review/editing service for image/video capturing systems that are prone to human error. Operators often have difficult framing images and videos during capture operations, particularly when capturing data of highly-dynamic subjects. In many consumer applications, operators attempt to frame content on the basis of content of a narrow FOV camera. It may occur that desired content of a subject was captured by a system through another camera but the operator is not made aware of the capture operation during the capture event itself. Through provision of the techniques described hereinabove, a system may generate new media items (images and/or video) representing detected objects and may propose the new media items to an operator during a review operation. If an operator approves of the new media item, the system 100, 300 either may store the new media item as a persistent media item in a "photos" or "videos" storage location, or it may substitute new media item for a corresponding item generated by one of the capture systems. In this regard, operation of the system 100, 300 is expected to yield higher-quality media items for operators notwithstanding their own difficulties during capture operations.

The foregoing embodiments have described the principles of the present disclosure as operating on systems that perform image capture, object tracking and composition. Such systems made be embodied by processing devices such as computer servers, personal computers, notebook computers, tablet computers, smartphones, media players and the like. Such operations may be employed in a single standalone computer system or have processing functionality distributed across multiple networked devices. While implementations vary, such systems may include processor(s) 710 and a memory system 720 (FIG. 7). The memory system 720 may store program instructions that represent an operating system 722 of the system and application programs 724. The program instructions may be executed by the processing device(s) 720. The memory system also may represent storage 145 (FIG. 1), 345 (FIG. 3) for the media items discussed in the foregoing figures.

The video stabilization processes described herein find application in a wide variety of applications in use cases. Such techniques may be applied to single camera video capture systems and perform stabilization operations to a single stream of video. Such techniques may be performed in video capture systems that do not perform independent object detection or use compositors. For example, such techniques find application in ordinary consumer electronic devices such as smartphones, tablet computers, and digital cameras.

Several embodiments of the disclosure are specifically illustrated and/or described herein. However, it will be appreciated that modifications and variations of the disclosure are covered by the above teachings and within the purview of the appended claims without departing from the spirit and intended scope of the disclosure.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

We claim:

1. A system, comprising:
    a first camera characterized by a first field of view,
    a second camera characterized by a second field of view wider than the first field of view,
    an object tracker having an input coupled to an output of the second camera,
    an image processor having an input for content captured by the second camera and an input for data output by the object tracker representing location(s) of object(s) detected by the object tracker from the output of the second camera, and having an output for content of the second camera processed in a location of at least one detected object.

2. The system of claim 1, wherein the compositor output is a cropped representation of content output by the second camera.

3. The system of claim 2, wherein the cropped representation occurs by a cropping window having a location that tracks a location of the detected object.

4. The system of claim 1, wherein the detected object is an object selected from a central region of the content output by the second camera.

5. The system of claim 1, wherein the detected object is a largest-sized object of the content output by the second camera.

6. The system of claim 1, wherein the detected object is an operator-selected object.

7. The system of claim 1, wherein the compositor output is a cropped and zoomed representation of content output by the second camera.

8. The system of claim 1, further comprising a motion sensor, wherein the compositor output is a motion stabilized representation of content output by the second camera.

9. The system of claim 1, wherein the compositor output is a perspective-corrected representation of content output by the second camera.

10. The system of claim 1, wherein the compositor output is a horizon-corrected representation of content output by the second camera.

11. The system of claim 1, further comprising a storage system to store the output from the compositor as a media item.

12. The system of claim 11, wherein the storage system stores output from the second camera as a media item distinct from the media item output from the compositor.

13. The system of claim 11, wherein the storage system stores output from the first camera as a media item distinct from the media item output from the compositor.

14. The system of claim 11, wherein the media item is a video.

15. The system of claim 11, wherein the media item is a still image.

16. The system of claim 1, further comprising a display to display content captured by the first camera during a capture operation.

17. The system of claim 1, further comprising:
a display coupled to the output of the first camera to assist an operator of the single device in framing the first field of view on a scene;
wherein the first camera and the second camera are facing in a common direction and mounted in a single device, and the first field of view of the first camera is subsumed by the wider field of view of the second camera.

18. The system of claim 17, further comprising:
an object selector for selecting a primary object for tracking by the object tracker;
wherein the primary object is selected from within a region of the wider field of view of the second camera that overlaps with the first field of view of the first camera.

19. A method, comprising:
capturing content with a pair of cameras, a first camera having a wider field of view than a second camera,
detecting object(s) from captured content from the wider field of view camera with an object detector having an input coupled to the output of the wider field of view camera,
processing the captured content from the wider field of view camera in a location of at least one detected object with an image processor having a first input coupled to the output of the wider field of view camera and a second input coupled to the output of the object detector.

20. The method of claim 19, wherein the processing crops the captured content of the wider field of view camera.

21. The method of claim 19, wherein the detected object is an object selected from a central region of the content output by the wider field of view camera.

22. The method of claim 19, wherein the detected object is a largest-sized object of the content output by the wider field of view camera.

23. The method of claim 19, wherein the detected object is an operator-selected object.

24. The method of claim 19, wherein the processing zooms the captured content of the wider field of view camera.

25. The method of claim 19, wherein the processing performs motion stabilization on content output by the wider field of view camera based on motion data from a motion sensor.

26. The method of claim 19, wherein the processing corrects perspective of content output by the wider field of view camera.

27. The method of claim 19, wherein the processing corrects a horizon of content output by the wider field of view camera.

28. The method of claim 19, further comprising storing the processed content as a media item.

29. The method of claim 28, further comprising storing output from the wider field of view camera as a media item distinct from the media item represented by the processed content.

30. The method of claim 28, further comprising storing output from the second camera as a media item distinct from the media item represented by the processed content.

31. The method of claim 28, wherein the media item is a video.

32. The method of claim 28, wherein the media item is a still image.

33. The method of claim 19, further comprising displaying content captured by the second camera during a capture operation.

34. The method of claim 19, wherein the object detector is an object tracker.

35. A non-transitory computer readable memory storing program instructions that, when executed by a processing device, cause the device to:
display content captured by a first camera during a capture operation,
responsive to content captured by a second camera having a wider field of view than the first camera, detect object(s) from the captured content from the second camera with an object detector having an input coupled to the output of the wider field of view camera,
process the captured content from the wider field of view camera in a location of at least one detected object with an image processor having a first input coupled to the output of the wider field of view camera and a second input coupled to the output of the object detector.

36. The memory of claim 35, wherein the processing crops the captured content of the second camera.

37. The memory of claim 35, wherein the detected object is selected from a central region of the content output by the second camera.

38. The memory of claim 35, wherein the detected object is a largest-sized object of the content output by the second camera.

39. The memory of claim 35, wherein the detected object is an object selected by an operator from the displayed content.

40. The memory of claim 35, wherein the processing zooms the captured content of the second camera.

41. The memory of claim 35, wherein the processing corrects perspective of content output by the second camera.

42. The memory of claim 35, wherein the processing corrects a horizon of content output by the second camera.

\* \* \* \* \*